United States Patent [19]
Martin et al.

[11] Patent Number: 5,846,428
[45] Date of Patent: *Dec. 8, 1998

[54] METHOD FOR MODIFYING THE SURFACE OF A POLYMER MEMBRANE, AND A MEMBRANE THUS MODIFIED

[75] Inventors: Didier Martin, Givry; Olivier Jean-Christian Poncelet; Jeanine Rigola, both of Chalon S/Saone, all of France

[73] Assignee: Eastman Kodak Company, Rochester, N.Y.

[ * ] Notice: The term of this patent shall not extend beyond the expiration date of Pat. No. 5,599,588.

[21] Appl. No.: 682,641
[22] PCT Filed: Nov. 22, 1995
[86] PCT No.: PCT/FR95/01541
§ 371 Date: Sep. 23, 1996
§ 102(e) Date: Sep. 23, 1996
[87] PCT Pub. No.: WO96/15847
PCT Pub. Date: May 30, 1996

[30] Foreign Application Priority Data

Nov. 23, 1994 [FR] France .................................. 94 14309

[51] Int. Cl.$^6$ .................................. B01D 61/00
[52] U.S. Cl. .................. 210/651; 210/653; 210/496; 210/500.26; 210/500.41; 210/500.29; 210/500.25; 427/343; 427/165; 427/244
[58] Field of Search .................................. 210/650, 651, 210/490, 500.41, 500.35, 500.29, 500.25, 500.26, 653; 427/244, 343, 165; 501/40

[56] References Cited

U.S. PATENT DOCUMENTS

| | | | |
|---|---|---|---|
| 3,475,192 | 10/1969 | Langley | 427/165 |
| 4,163,713 | 8/1979 | Keogh | 210/511 |
| 4,672,113 | 6/1987 | Wallisch et al. | 210/650 |
| 5,051,278 | 9/1991 | Paz-Pusalt | 427/165 |
| 5,137,634 | 8/1992 | Butler et al. | 210/500.25 |
| 5,268,196 | 12/1993 | Boulos et al. | 427/165 |
| 5,318,688 | 6/1994 | Najjar et al. | 210/500.25 |
| 5,599,588 | 2/1997 | Poncelet | 427/343 |

*Primary Examiner*—Ana Fortuna
*Attorney, Agent, or Firm*—John R. Everett

[57] ABSTRACT

The present invention concerns a method for modifying the transfer characteristics of a porous organic or inorganic membrane, in which a) on the said membrane, at least one layer is formed by applying at least one homogeneous solution obtained by mixing one or more rare-earth or alkaline-earth fluoroalkoxides in an anhydrous organic solvent at room temperature and in an inert atmosphere, b) hydrolysis is effected by placing the coating formed at a) in contact with a quantity of water at least equal to the stoichiometric quantity required to hydrolyse the fluoroalkoxides, c) the membrane is rinsed with water to eliminate the soluble salts formed. The membranes thus modified are useful for the regeneration of photographic solutions, in particular black and white developers, or for the separation of organic compounds from aqueous effluents.

10 Claims, 2 Drawing Sheets

METHOD FOR MODIFYING THE SURFACE OF A POLYMER MEMBRANE, AND A MEMBRANE THUS MODIFIED

The present invention concerns a method for modifying the surface of a membrane and membranes which can be obtained using this method. The method according to the invention enables the surface of a porous organic or inorganic membrane to be modified, so as to control the volume of liquid transported and the diffusion of species through the membrane. The membranes thus modified are useful for the regeneration of photographic solutions, in particular black and white developers, or for the separation of organic compounds from aqueous effluents.

Membranes are widely used in separation techniques. The transport of fluids through membranes takes place by means of different mechanisms, which depend on the structure and nature of the membrane. The most widely used membranes are formed from synthetic or natural organic polymers. Porous membranes contain voids which are large compared with the size of the molecules transported. In these membranes, the pores are interconnected and the solid materials represent only a small percentage of the total volume of the membrane. The porous membranes available commercially have a pore size of between 0.005 $\mu$m and 20 $\mu$m. They are made from a great variety of polymers so as to obtain a wide range of rigidities and mechanical strengths. Generally, for separation in the aqueous phase, either hydrophilic membranes or hydrophobic membranes are used, according to the experimental conditions (pH, oxidising medium), but also according to the type of molecules to be separated. Thus molecules of the hydrophobic type will tend to be adsorbed more on a hydrophobic support. In order to prevent these molecules from being adsorbed, the surface of the hydrophobic support can be modified by incorporating a hydrophilic group or by means of a fine surface deposition of a hydrophilic polymer.

For pressurised technologies (microfiltration, ultrafiltration, nanofiltration, reverse osmosis), polymers of the hydrophilic type are quite suitable, since they make it possible to have high flows. This is true of cellulose and its derivatives, which have been used in reverse osmosis for a very long time (high flow, good separation selectivity, low cost). However, porous membranes of the hydrophilic type are highly sensitive to the phenomenon of swelling when they come into contact with an aqueous solution (and this behaviour can be more pronounced depending on the pH). Furthermore, these hydrophilic materials have low stability in the presence of certain polar organic solvents, acids or bases, as well as oxidants (chorine, hypochlorite). These materials are also extremely sensitive to bacterial growth, all the more so since they cannot be subjected to base+oxidant or acid+oxidant treatments owing to their low resistance to these chemical agents. For these materials, control of the hydrophilic/hydrophobic balance enables the chemical stability of the support to be increased as a function of the pH and the various aforementioned reagents. It also increases the resistance of these materials to the mechanical stresses arising from the pressure of use.

For systems of the dialysis type, in general what is involved is the separation of the macromolecules and the mineral species (salts) or molecules with a low molecular weight. In this case, hydrophilic materials of the cellulose type and derivatives of cellulose are very well suited to treatment of such environments (high proportion of water). The osmotic forces constitute the "driving" element of this separation process. In this precise case, modification of the hydrophilic/hydrophobic balance will be used to increase the stability of the membrane vis-a-vis the experimental conditions (pH, presence of organic solvents, etc). In general, in the case of dialysis, no attempt is made to control the flow of water; the initial solution is diluted and the small molecules are transported through the membrane. If the solution is to be concentrated, another technology such as ultrafiltration is used in addition to dialysis. On the other hand, in the case of regeneration of photographic baths, the control of the flow of water is an important parameter, since it is not wished to dilute the solution to be treated.

Other asymmetrical polymer materials obtained from mixtures of monomers exist. Their functioning is described, for example, in Chapter I, entitled "Physical Chemistry of Membranes", page 19 of *Membrane Science and Technology*, edited by Y. Osada and T. Nakagawa. "The hydrophobic domain prevails on one side of the membrane, where in contact with the hydrophobic substrate, and the hydrophilic domain prevails on the other side of the membrane. A flow reversal effect has been observed for such asymmetric membranes when the concentration dependence of the diffusion coefficient through a hydrophilic membrane is marked. A high permeability coefficient is obtained when the hydrophilic penetrant permeates the membrane from the hydrophilic side of the asymmetric membrane. On the other hand, the permeability coefficient is low when the hydrophilic penetrant permeates from the hydrophobic domain side".

Hydrophobic porous membranes are highly resistant to chemical substances and do not swell in water. On the other hand, they function only under pressure, and even under these conditions they do not allow the water to pass sufficiently. It is therefore necessary to treat these membranes in order for their pores to have a hydrophilic surface. Numerous known methods for making the surface of hydrophobic membranes hydrophilic are described in "Synthetic Polymeric Membranes, a Structural Perspective", Second Edition, by Robert E Kesting, published by Wiley-Interscience (New York, 1985).

For example, U.S. Pat. No. 5,098,569 describes a membrane support with a modified surface, in which a monomolecular layer of a hydrophilic polymer derived from cellulose is grafted onto a porous hydrophobic membrane. The membrane obtained is stable in ethanol.

Polyacrylonitrile membranes are naturally rather hydrophobic but are not lipophobic. For certain specific applications, it is necessary to increase their lipophobia so as to avoid clogging by organic compounds. They are electrostatically neutral and possess higher physical resistance to alkalis than cellulose and its derivatives. Functionalised polyacrylonitrile membranes are available commercially which are used for the recycling of paint baths, the purification and concentration of animal or vegetable proteins and the purification of vaccines and antibodies. The use of these membranes under pressure enables the osmotic pressure forces to be compensated for, but if they are used in a process of the dialysis type, a phenomenon of osmosis with passage of the dilute phase into the concentrated phase is observed, the size of the pores being the sole selection factor in the particular case of dialysis. (In the normal case where they are used with a pressure gradient in ultrafiltration, the electrostatic effects associated with the surface charge are also very significant).

Modification of the surface of a membrane having a hydrophilic character is also known. For example, the patent DD 296220 describes a method for modifying the surface of cellulose membranes by causing a cellulose membrane to react with a carboxylic acid halide in solution in an aprotic polar solvent, in a medium catalysed by a base. The halogenated function is thereafter partially sulphonated with bisulphite, and then the membrane is rinsed. These membranes are used in dialysis and are compatible with blood.

The patent DD 278495 describes a method of obtaining a haemodialysis membrane by modifying the surface of a regenerated cellulose membrane modified by treatment with a polyisocyanate. The membranes modified in this way can be used in haemodialysis, haemofiltration or diafiltration. These membranes, like those of the patent DD 296220, are not designed for the separation of organic compounds and salts in aqueous media.

The regeneration of photographic baths generally is effected with ion-exchange resins, in the case of developers of the colour type, or by electrodialysis. In the case of black and white developers, it is wished to keep the activity in the bath constant, for example through continuous selective elimination of the bromide ions in a developing bath. No known technique enables the halides to be separated from the organic compounds, such as hydroquinone and its derivatives. Until now, it was not possible to use dialysis for the regeneration of black and white baths, since the known membranes did not enable the flow of water to be controlled to avoid dilution of the bath.

The method according to the present invention makes it possible to modify the transfer characteristics of a porous organic or inorganic membrane, that is to say to reduce the flow of liquid transported, and to control the diffusion of the species in solution through the membrane, thereby improving the efficiency of the separation.

The method according to the invention comprises the following steps:

a) on the said membrane, at least one layer is formed, obtained by applying at least one homogeneous solution obtained by mixing one or more rare-earth or alkaline-earth fluoroalkoxides in an anhydrous organic solvent at room temperature and in an inert atmosphere, b) hydrolysis of the fluoroalkoxide or fluoroalkoxides is effected by placing the layer formed at a) in contact with a quantity of water at least equal to the stoichiometric quantity required to hydrolyse the fluoroalkoxides, c) the membrane is rinsed with water to eliminate the soluble salts formed.

Another object of the invention concerns the novel membranes obtainable by this method.

Another object of the invention is the use of these membranes for the regeneration of photographic solutions, in particular black and white developers, and the separation of organic compounds from aqueous effluents.

The method according to the present invention makes it possible to modify selectively, by increasing its hydrophobic and/or lipophobic character, either solely the surface of the pores within the membrane, or the entire surface of the porous membrane (that is to say all the external surfaces of the membrane and the surface of the pores which are distributed within the membrane). As will be seen in the examples, the type of modification made will depend on:

1) the polymer material of the membrane. (Hydrophilic cellulose, possessing free hydroxyl groups, allows higher reactivity of the fluoroalkoxides, while a material of the "hydrophobic type" will have lower reactivity with fluoroalkoxides).

2) the alkaline-earth (or rare-earth) metal associated with the fluoroalkoxide, 3) the alkoxo radical. The preponderant factors are the length of the carbon chain, the branched or linear character of the chain and the number of fluorine atoms.

BRIEF DESCRIPTION OF DRAWINGS

In the description that follows, reference will be made to the drawings in which.

DETAILED DESCRIPTION

Figure 1:
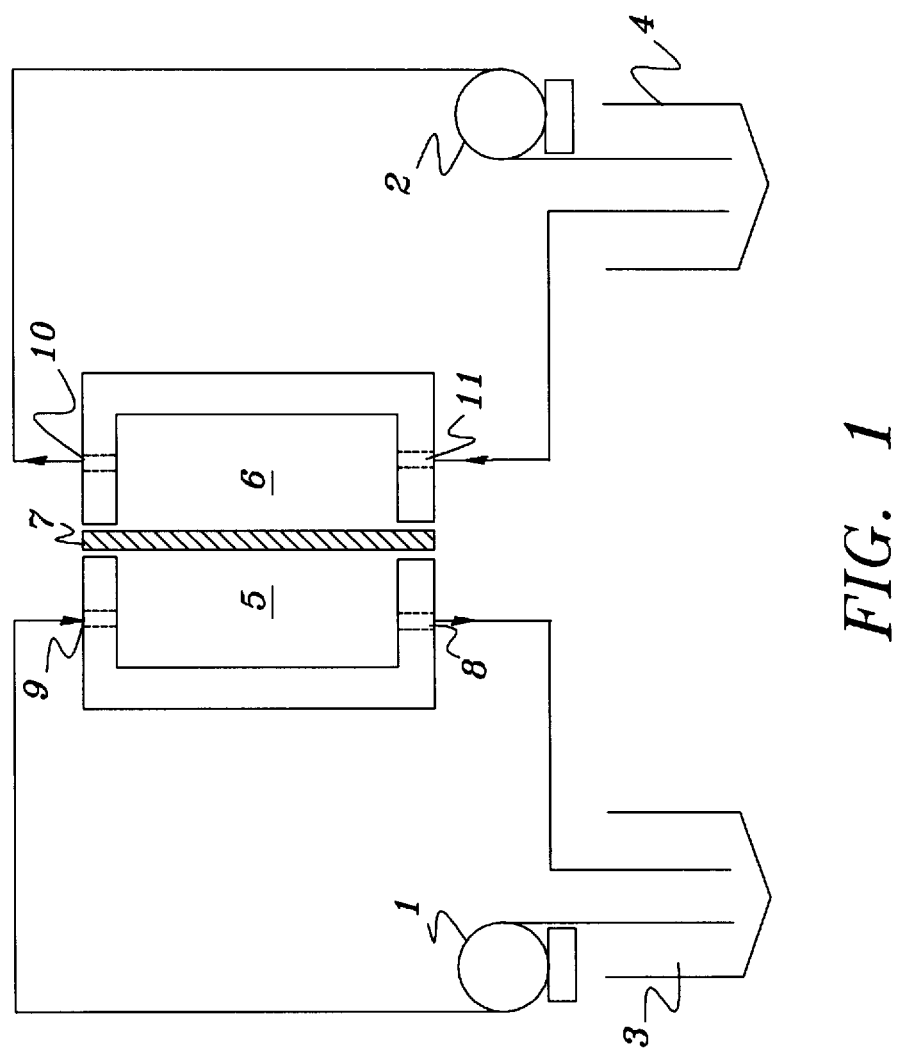
FIG. 1 depicts an assembly used for the regeneration of photographic baths.

In step a), the alkaline earths are chosen from amongst elements in group IIA, such as beryllium, magnesium, calcium, strontium, barium or radium, and the rare earths are chosen from amongst elements in group IIIB, such as scandium, yttrium, lanthanum, cerium, gadolinium, erbium or ytterbium. The preferred fluoroalkoxides are barium, calcium and strontium fluoroalkoxides.

The initial rare-earth or alkaline-earth fluoroalkoxides can be obtained by any one of the methods known in the art. In general, they are obtained from the corresponding alkaline-earth or rare-earth alkoxide or alkoxides.

The preparation of alkaline-earth alkoxides can be effected by various syntheses known in the art. A synthesis which is easy to implement consists of reacting an alcohol directly on an alkaline earth. The yield of such a synthesis depends in particular on the steric hindrance of the alcohol used. The lower the steric hindrance of the alcohol, the faster the synthesis of the alkaline-earth alkoxides. Preferably, the alcohol is chosen from amongst methanol, ethanol or propanol.

Rare-earth alkoxides can be synthesised either by reacting a rare-earth chloride with an alkaline-metal alkoxide, or reacting rare earth directly with an alcohol such as 2-propanol, or a functionalised alcohol such as 2-methoxyethanol or ethylene glycol monomethyl ether.

The rare-earth or alkaline-earth fluoroalkoxides used in the present invention can be obtained either through the alcoholysis of rare-earth or alkaline-earth alkoxides by a fluorinated or perfluorinated alcohol, hereinafter referred to as a "fluoroalcohol", or by reacting the alkaline earth with the fluoroalcohol directly in solution in a polar solvent. Preferably, they are obtained by the alcoholysis of barium, strontium and calcium alkoxides with fluoroalcohols.

Fluoroalcohols are hydrogenated alcohols with a more or less long chain, straight or branched. The fluoroalcohols able to be used in the present invention have at least 3 and at most 10 fluorine atoms and a fluorine to carbon ratio of at least 1.5 and at most 2.5. The preferred fluoroalcohols have a number of fluorine atoms between 3 and 10 and a number of carbon atoms between 2 and 5 and are, for example, chosen from amongst perfluorotertiobutanol, 2,2,2-trifluoroethanol, 1,1,1,3,3,3-hexafluoro-2-propanol, 2,2,2,3,4,4,4-hexafluoro-1-butanol, 1,1,1,2,2,3,3-heptafluoro-4-butanol or 2,2,3,3,4,4,5,5-octafluoro-1-pentanol.

In step a) of the method of the present invention, on the porous support forming the membrane, a solution is applied which contains the fluoroalkoxide or fluoroalkoxides in an anhydrous organic solvent miscible with water, in an inert atmosphere and at room temperature. The preferred solvents are tetrahydrofuran, alcohols or ketones. The quantity of solid matter in the solution containing the fluoroalkoxide is between 0.1 and 100 g/l.

The porous supports which can be used within the scope of the present invention can be mineral membranes or organic polymer membranes, such as those described in Reverse osmosis and ultrafiltration, Chapter II, entitled "Technology and applications", by Alain Maurel, in Techniques de l'ingénieur J2796, pages 4 to 13.

The mineral membranes are chosen from amongst membranes made of silica, alumina, zirconia or titanium oxide or mixtures of these oxides or else carbon membranes, optionally coated with a fine layer of oxide.

The organic polymer membranes are, for example, membranes of cellulose or cellulose derivatives, preferably regenerated cellulose, or membranes of polyacrylonitrile, polysulphone, polyethersulphone or fluorocarbonated polymers. The preferred organic membranes have reactive groups on the surface, for example hydroxyl groups as in cellulose supports.

Organic or mineral membranes can include functionalised groups making it possible to have a positive surface charge (for example by introducing ammonium or phosphonium groups), or to have a negative surface charge (for example by introducing sulpho, carboxy groups, etc).

The membranes can take the form of flat, spiral or tubular modules, or of hollow fibre modules.

It is possible to apply the fluoroalkoxide solution to the surface of the membrane by any known method for applying sol-gel, for example using a coating bar, an air knife by roll coating or by soaking, spin coating, bead coating, curtain coating or by spraying or by circulating the metallic fluoroalkoxide in the reactor containing the membrane under appropriate conditions.

It has been found that, if the membrane is moistened prior to step a), the extraction and separation performance of the membrane is improved. The moistening of the membrane affords cleaning and activation of the surface of the membrane, and facilitates the hydrolysis reaction. Moistening is obtained by soaking in a solution of water and alcohol or by placing the membrane in an atmosphere saturated with water vapour.

In step b), the quantity of water for hydrolysing the fluoroalkoxides must be at least equal to the stoichiometric quantity and less than 5 times, preferably less than twice, this stoichiometric quantity. In general, the process is carried out at atmospheric humidity. It is possible to combine this hydrolysis with any other known complementary method that does not impair the organic support, such as placing the membrane in an oven under controlled humidity.

After hydrolysis, the solvent is left to evaporate and a hydrophobic layer based on alkaline earth (or rare earth) is obtained.

It is possible to vary the thickness of the coating obtained, either by varying the initial concentration of metallic fluoroalkoxides or by repeating the sequence a)–b) several times and leaving the porous support in the open air for several minutes between each deposition. It is also possible to produce successively, in the same way, several layers with fluoroalkoxides differing in terms of the nature of the alkoxo radical or in terms of the nature of the alkaline-earth (or rare-earth) metal.

At step c), the membrane is rinsed with water. This step eliminates the water-soluble metal salts which could be detrimental when the membrane is used to treat certain solutions, such as photographic solutions.

EXAMPLES A–H

These examples concern the preparation of the fluoroalkoxides used in the present invention.

Example A

Synthesis of barium fluoroalkoxide Ba6R

Under argon, 13.6 g (0.0099 mol) of barium is added to 200 ml of anhydrous ethanol to form a solution. The reaction is exothermic, with the release of hydrogen. The reaction medium is filtered in order to eliminate residual colloids. The filtrate is concentrated at $10^{-2}$ mm Hg and dried for 12 hrs to give a dusty white powder, elementary analysis of which shows that it contains approximately 60% barium by weight.

Under argon, 22.5 g of this powder is introduced into 300 ml of anhydrous tetrahydrofuran (THF), and then 21 ml of hexafluoro-2-propanol is added drop by drop at room temperature.

The mixture is left to react for 2 hours under agitation (highly exothermic reaction). The product is purified by crystallisation in anhydrous tetrahydrofuran. 42 g of white powder is recovered, elementary analysis of which shows that it contains approximately 30% barium by weight.

Example B

Synthesis of barium fluoralkoxide Ba6L 1.8 ml of hexafluorobutanol is added to a mixture consisting of 1.7 g of white powder produced by the action of anhydrous ethanol on the barium prepared as in Example A, and 100 ml of a 1:1 mixture of anhydrous THF and anhydrous ethanol, under argon at room temperature.

The solution turns orange and the reaction is slightly exothermic. Little by little, the formation of particles in suspension is observed. By leaving it to decant, 3.76 g of fine powder is obtained, elementary analysis of which shows that it contains approximately 28% barium by weight.

Example C

Synthesis of calcium fluoroalkoxide Ca6R

Under argon, 29.7 g (0.72 mol) of calcium is added to 200 ml of anhydrous ethanol to form a solution. The reaction is catalysed with hexamethylsilazane and the solvent is brought to reflux. A microcrystalline white powder precipitates when the medium is cooled, and for this reason the reaction medium is filtered hot. The filtrate is evaporated and dried at $10^{-2}$ mm Hg. A fine powder is recovered, elementary analysis of which shows that it contains approximately 30% calcium by weight.

Under argon, 11.2 g of the white powder produced by the reaction of the anhydrous ethanol on the calcium is introduced into 100 ml of anhydrous tetrahydrofuran (THF), and then 20 ml of hexafluoro-2-propanol is added drop by drop at room temperature.

The mixture is left to react for 4 hours under agitation (highly exothermic reaction). The clear reaction medium is evaporated dry and dried for 12 hrs at $10^{-2}$ mm Hg. 24.5 g of dusty white powder is recovered, elementary analysis of which shows that it contains approximately 10% calcium by weight.

Example D

Synthesis of barium fluoroalkoxide Ba3L

The procedure of example A is followed, replacing the hexafluoro-2-propanol with trifluoroethanol. When fluoroalcohol is added, the reaction is slightly exothermic. After a day under agitation at room temperature, the clear reaction medium is evaporated dry and dried for 12 hrs at $10^{-2}$ mm Hg. A dusty powder is obtained, elementary analysis of which shows that it contains approximately 70% barium by weight.

Example E
Synthesis of barium fluoroalkoxide Ba7L

The procedure of example A is followed, replacing the hexafluoro-2-propanol with 4-heptafluoro-1-butanol. When fluoroalcohol is added, the reaction is slightly exothermic. After evaporation and drying, 3.45 g of dusty powder is obtained, elementary analysis of which shows that it contains approximately 26% barium by weight.

Example F
Synthesis of barium fluoroalkoxide Ba8L

The procedure of example A is followed, replacing the hexafluoro-2-propanol with octafluoro-1-pentanol. When fluoroalcohol is added, the reaction is not exothermic. The clear reaction medium is evaporated dry and dried for 12 hrs at $10^{-2}$ mm Hg. 5.75 g of a fine powder is obtained, elementary analysis of which shows that it contains 23% barium by weight.

Example G
Synthesis of calcium fluoroalkoxide Ca8L

The procedure of example C is followed, replacing the hexafluoro-2-propanol with octafluoro-1-pentanol. When fluoroalcohol is added, the precipitation of a white substance is observed. The substance is isolated by filtration and then dried under vacuum for 12 hrs at $10^{-2}$ mm Hg. A viscous white substance is obtained, elementary analysis of which shows that it contains approximately 8% calcium by weight.

Example H
Synthesis of strontium fluoroalkoxide Sr6R 9.9 g of strontium (0.113 mole) is introduced into 100 ml of anhydrous ethanol. The reaction is exothermic. After 12 hrs of heating of the ethanol at boiling point, the reaction medium is filtered hot. As soon as the filtrate cools to room temperature, a crystalline white substance precipitates. This substance is isolated by filtration and dried for 12 hrs at $10^{-2}$ mm Hg. 18 g of a white powder is obtained, elementary analysis of which shows that it contains approximately 50% strontium by weight.

This white powder is put in suspension in anhydrous THF, then 22.5 ml of hexafluoroisopropanol is added, and the medium clears. The reaction medium is then evaporated dry and dried for 12 hrs at $10^{-2}$ mm Hg. A dusty yellow powder is obtained, elementary analysis of which shows that it contains approximately 21% strontium by weight.

EXAMPLES 1–4

These examples describe how a hydrophobic layer is obtained on a porous support.

In these examples, the various fluoroalkoxides are deposited on a porous cellulose or polyacrylonitrile support. The fluoroalkoxides are put in solution at 1 g of fluoroalkoxide to 50 ml of anhydrous ethanol under inert gas. Four passes are effected over the support by means of a bar, depositing 125 μm of solution each time. Between each deposition, the porous support is left in the open air for 5 mins. Hydrolysis takes place with the moisture present in the air. The solvent is left to evaporate. A hydrophobic layer based on alkaline earth is obtained.

After 5 mins, the porous support is immersed in a beaker of water osmosed to eliminate the soluble salts of Ca, Ba or Sr formed.

To evaluate the change in the surface state, the wetting angle of the porous support is measured

- before the layer is deposited,
- after the layer obtained by the method described above is deposited,
- after the use of the membrane in a bath of photographic developer containing silver halides and organic compounds used to develop radiographic products.

The wetting angle θ is determined by the Wilhemy strip method, which is based on the measurement of the force required to pull from a liquid a thin sheet of a sample suspended on one of the arms of a balance and immersed in this liquid. The liquid is maintained at 24° C. The surface tension of the liquid γ is first measured using a strip of filter paper for which θ=0. The wetting angle is defined by the following formula $$\cos\theta = \Delta W / Pe\gamma$$

where

- $\Delta W$ is the variation in the weight of the sheet at the moment it makes contact with the liquid, and
- Pe is the perimeter of the sheet.

Within the scope of the present invention, a variation in the wetting angle of ±3° shows a change in the surface state. The hydrophobic character increases with the value of the wetting angle.

The measurement of the "treated side" wetting angle shows the change in the surface state of the membrane on the side where the fluoroalkoxide solution is applied.

The measurement of the "untreated side" wetting angle shows the change in the surface state of the membrane on the side opposite the side where the fluoroalkoxide solution is applied.

The measurement of the "used side" wetting angle shows the change in the surface state of the membrane when it has been placed in contact with the developer for several hours. A small reduction in the wetting angle shows that the hydrophobic layer obtained by the method of the invention is stable in a highly basic medium.

In order to determine the separation characteristics of the organic molecules and salts, the membrane is placed in contact with a developing solution with the formula:

| | |
|---|---|
| hydroquinone (HQ) | 21.00 g/l |
| hydroquinone monosulphate (KHQS) | 13.40 g/l |
| phenidone-A | 0.69 g/l |
| bromide* | 3.46 g/l |
| sulphite* | 8 g/l |
| water qsp 1l | |

*The bromide and sulphite are in the form of Na salts.

In order to test the membranes, the assembly depicted in FIG. 1 is used. The system which comprises the membrane is composed of two compartments 5) and 6) each containing approximately 50 ml, separated by a membrane 7) of 10 cm², the whole forming a sealed system. 500 ml of developing solution contained in the reactor 3) circulates in the compartment 5) from the inlet 9) to the outlet 8) by means of a pump 1) with a flow rate of 25 ml/min. 180 ml of water contained in the reactor 4) circulates in the reverse direction in the compartment 6) from the inlet 11) to the outlet 10) by means of the pump 2) with a flow rate of 25 ml/min.

Example 1
Cellulose membrane

This example concerns the modification of the surface state of Spectra/Por regenerated cellulose membranes having a cutoff threshold of 6000 to 8000 daltons (diameter of pores around 2 nm) when they are treated with various fluoroalkoxides.

TABLE 1

|  | Wetting angle | |
|---|---|---|
| Fluoroalkoxide | Untreated side | Treated side |
| none | 34 | 38 |
| Ca6R | 75 | 73 |
| Ba6R | 54 | 117 |

Figure 2:
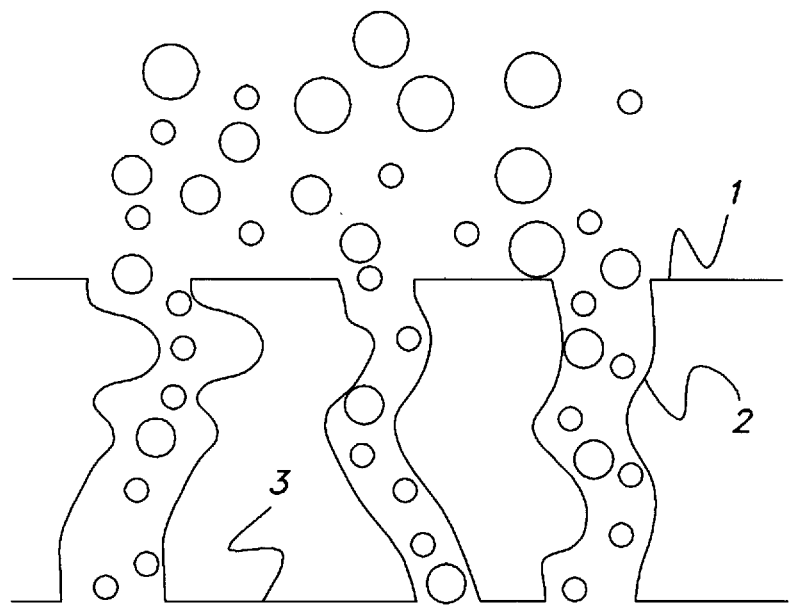
FIG. 2 depicts a diagrammatic view in cross section of a cellulose membrane.
Figure 3:
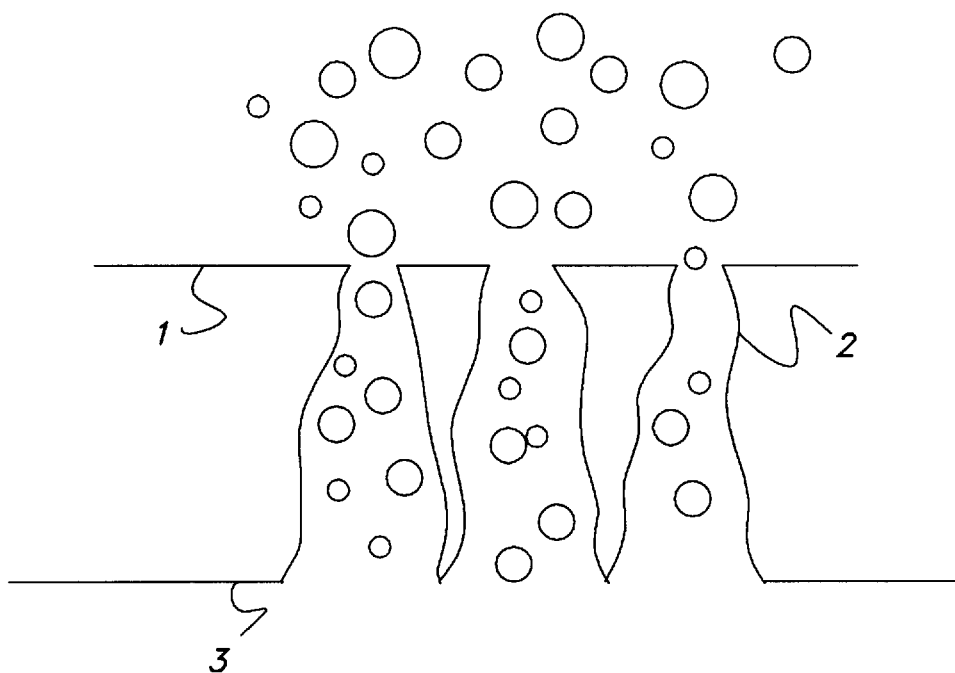
FIG. 3 depicts a diagrammatic view in cross section of a polyacrylonitrile membrane.

A significant change is observed in the hydrophobia of the cellulose support treated with the two fluoroalkoxides, compared with the untreated control. The barium fluoroalkoxide reacts rapidly, and the membrane treated in this case exhibits high asymmetry, as seen in the difference between the values of the wetting angle of the treated side 1) and untreated side 3) depicted in FIG. 2. With barium fluoroalkoxide, the side 1) is treated preferentially, the surface of the pores 2) and the side 3) also being treated, but to a lesser degree. With calcium fluoroalkoxide, hydrolysis is slower and both sides of the membrane 1) and 3) and the surface of the pores 2) exhibit the same hydrophobia.

Example 2
Selectivity of cellulose membranes

This example shows the improvement obtained in terms of flow and selectivity with the cellulose membrane of the preceding example treated with Ba6R.

TABLE 2

| Fluoro alkoxide | % $H_2O$/ 24 hrs | % Br/ 24 hrs | % HQ + KHQ S/ 24 hrs | FS1 | % phenidone-A/24 hrs | FS2 |
|---|---|---|---|---|---|---|
| none | 15 | 26 | 24 | 1.1 | 32 | 0.8 |
| Ba6R | 2 | 16 | 3 | 5.3 | 8 | 2.0 |

%$H_2O$/24 hrs represents the flow of water, that is to say the volume of water transferred into the developer in 24 hrs:

%$H_2O$/24 hrs=$100(Vf_{rev}-Vinit_{rev})/Vinit_{rev}$ where $Vf_{rev}$ represents the final volume of developer after 24 hrs of treatment through the membrane, $Vinit_{rev}$ represents the initial volume of the developer.

%Br/24 hrs represents the % of bromide extracted from the developing solution in 24 hrs.

%HQ+KHQS/24 hrs represents the % by weight of hydroquinone and hydroquinone monosulphate extracted from the developing solution in 24 hrs.

%phenidone-A/24 hrs represents the % of phenidone-A extracted from the developing solution in 24 hrs.

FS1 is the selectivity factor of Br with respect to HQ+KHQS (ratio as a % extracted in 24 hrs).

FS2 is the selectivity factor of Br with respect to phenidone-A (ratio as a % extracted in 24 hrs).

Given the low porosity of cellulose, ion transfers are slow, and this is the reason why the values are given for 24 hrs. The quantity of bromide extracted with the membrane treated with Ba6R is lower but the flow of water is considerably reduced and the selectivity factors significantly improved.

Example 3

This example concerns the modification of the surface state of polyacrylonitrile membranes of the IRIS A -40000D type, as referenced in the Prolabo 1996–1997 catalogue, when they are treated with various fluoroalkoxides.

TABLE 3

|  | Wetting angle | | |
|---|---|---|---|
| Fluoroalkoxide | Untreated side | Treated side | Used side |
| none | 61 | 67 | 47 |
| Ba3L | 60 | 74 | 59 |
| Ba6L | 82 | 80 | 66 |
| Ba6R | 85 | 95 | 86 |
| Sr6R | 58 | 77 | 68 |
| Ca6R | 63 | 67 | 59 |
| Ba7L | 81 | 77 | 66 |
| Ba8L | 71 | 74 | 71 |
| Ca8L | 71 | 86 | 73 |

As the porosity of the polyacrylonitrile membranes is less regular than that of the cellulose membranes, and the reactivity of these membranes with the fluoroalkoxides is lower than that of the cellulose, the fluoroalkoxides diffuse differently. The polyacrylonitrile membrane treated with Ba6R has less pronounced asymmetry than the cellulose membrane treated with the same fluoroalkoxide.

Whatever the fluoroalkoxide, the treated side exhibits greater hydrophobia after use than the control membrane, which proves that the polyacrylonitrile membrane has been modified. The change in the wetting angle is at its maximum for a branched alkoxo radical containing 6 fluorine atoms (Ba6R).

According to the values of the wetting angles, 1) comparing Ba6R, Sr6R and Ca6R, it is seen that, with the same alkoxo radical, barium is more efficacious than strontium, which is itself more efficacious than calcium, 2) comparing Ba6R and Ba6L, it is seen that, for the same number of fluorine atoms, the branched alkoxo radical is more efficacious than the linear radical, 3) comparing the linear alkoxo radicals for the same alkaline earth, it is seen that the chain is too short (Ba3L), and there is no change in the wetting angle. If the chain is long (Ba8L or Ca8L), the reactivity of the fluoroalkoxide falls and the change in the wetting angle is less than with Ba6L.

The wetting angle decreases a great deal for the control membrane after use. This shows that the control membrane cannot be used for continuous treatment. On the other hand, for treated membranes, the wetting angle remains larger than that of the control membrane before use. This shows that the treated membranes are stable in an alkaline environment and resistant to organic compounds.

The most hydrophobic character is that obtained with Ba6R. A slight fall in the value of the wetting angle is observed after the membrane has been placed in contact with the developing solution for two 24-hour cycles.

As in the case of cellulose membranes, for treatment with Ca6R, no asymmetry is observed in the treatment of the two sides and furthermore the hydrophobia of the surface is unchanged. However, the measurement of the wetting angle on the used side shows that the membrane is more stable than the control in an alkaline environment.

It is probable that the difference in behaviour between cellulose and polyacrylonitrile is due to the fact that the hydroxyl groups in cellulose assist the in-situ hydrolysis reaction of the fluoroalkoxide.

Example 4

Selectivity of polyacrylonitrile membranes

This example shows the improvement obtained in terms of flow and selectivity with the polyacrylonitrile membranes in the preceding example.

TABLE 4

| Fluoro alkoxide | % $H_2O$/ 24 hrs | % Br/ 6 hrs | % Br/ 24 hrs | % HQ + KHQS 6 hrs | FS1 | % phenidone A/6 hrs | FS2 |
|---|---|---|---|---|---|---|---|
| none | 36* | 17 | 25 | 20 | 0.85 | 11 | 1.5 |
| Ba3L | 36** | — | — | — | — | — | — |
| Ba6L | 3 | 16 | 35.8 | 5.1 | 3.13 | 12.8 | 1.2 |
| Ba6R | 18 | 22 | 34 | 7.5 | 2.93 | 12.5 | 1.8 |
| Sr6R | 3 | 20.8 | 25 | 9 | 2.31 | 10.3 | 2.0 |
| Ca6R | 14 | 40 | 28 | 4.1 | 9.75 | 12.3 | 3.2 |
| Ba7L | 43 | 28 | 30 | 4 | 7 | 13 | 2.1 |
| Ba8L | 10 | 32.8 | 37 | 3.5 | 9.37 | 13.3 | 2.5 |
| Ca8L | 2 | 29.6 | 31.4 | 12.1 | 2.44 | 16 | 1.8 |

*for the purpose of this experiment, after 24 hrs of operation, all the water had diffused into the compartment containing the developer, and after 6 hrs of operation 90% of the water had diffused into this compartment.
**For the purpose of this experiment, all the water had diffused into the compartment containing the developer after 1 hr of operation. Excessive transport of water rendered extraction measurements impossible.

*for the purpose of this experiment, after 24 hrs of operation, all the water had diffused into the compartment containing the developer, and after 6 hrs of operation 90% of the water had diffused into this compartment.

**For the purpose of this experiment, all the water had diffused into the compartment containing the developer after 1 hr of operation. Excessive transport of water rendered extraction measurements impossible.

%$H_2O$/24 hrs is as defined previously.

%Br/6 hrs and %Br/24 hrs represent the % of bromide extracted from the developing solution, in 6 hrs and 24 hrs respectively.

%HQ+KHQS/6 hrs represents the % by weight of hydroquinone and hydroquinone monosulphate extracted from the developing solution in 6 hrs.

%phenidone-A/6 hrs represents the % of phenidone-A extracted from the developing solution in 6 hrs.

FS1 is the selectivity factor of Br with respect to HQ+KHQS (ratio as a % extracted in 6 hrs).

FS2 is the selectivity factor of Br with respect to phenidone-A (ratio as a % extracted in 6 hrs).

Given the high porosity of the polyacrylonitrile membrane, ion transfers are rapid; this is why the extraction and extraction selectivity values are given at 6 hrs.

It can be seen that, compared with the control, better results are obtained for the flow of water, the % of bromide extracted and the selectivity with all fluoroalkoxides, except Ba3L, which does not form part of the invention.

In the case of Ca6R, although the values of the wetting angle on the treated and non-treated sides are very close to those of the control, comparisons between the flow and extraction values and those of the control show that the membrane has been modified considerably by the treatment.

Example 5

This example shows the improvement obtained in terms of flow and selectivity when the polyacrylonitrile membrane is moistened before the application of fluoroalkoxide. For this purpose, comparison is made between the performance of a dry membrane, that is to say one washed with a mixture of water and ethanol (1:1 by volume), dried for 24 hrs at room temperature and then treated with Ba6R, and a moistened membrane, that is to say one washed before step a) of the treatment with a mixture of water and ethanol (1:1 by volume) and then treated after 5 min with Ba6R.

TABLE 5

| Membrane | % $H_2O$/ 24 hrs | % Br/ 6 hrs | % Br/ 24 hrs | % HQ + KHQS/ 6 hrs | FS1 | % phenidone- A/6 hrs | FS2 |
|---|---|---|---|---|---|---|---|
| dry | 18 | 16.7 | 33.8 | 5.3 | 3.1 | 8.3 | 2.0 |
| moist | 30 | 35 | 32 | 0 | ∞ | 5.8 | 6.0 |

It can be seen that, when the membrane is moistened before the application of the fluoroalkoxide, the separation performance of the membrane is very much improved since the organic compounds are no longer transported but the flow of liquid increases.

We claim:

1. Method for modifying the transfer characteristics of a porous organic or inorganic membrane, comprising the steps of
    a) forming on said membrane, at least one layer from an homogeneous solution obtained by mixing one or more rare-earth or alkaline-earth fluoroalkoxides in an anhydrous organic solvent at room temperature under inert atmosphere,
    b) hydrolysing the fluoroalkoxide or fluoroalkoxides by contacting the layer formed at a) with a quantity of water at least equal to the stoichiometric quantity required to hydrolyse the fluoroalkoxides,
    c) washing the membrane with water to eliminate the soluble salts formed.

2. Method according to claim 1, in which the rare-earth or alkaline-earth fluoroalkoxide is the substance obtained through alcoholysis of a rare-earth or alkaline-earth alkoxide with a fluoroalcohol having at least 3 and at most 10 fluorine atoms and a fluorine to carbon ratio of at least 1.5 and at most 2.5.

3. Method according to claim 2, in which the alkaline earth is chosen from amongst Ba, Ca and Sr.

4. Method according to claim 3, in which the fluoroalkoxide is the substance obtained through alcoholysis of a barium, strontium or calcium alkoxide with a fluoroalcohol chosen from amongst perfluorotertiobutanol, 2,2,2-trifluoroethanol, 1,1,1,3,3,3-hexafluoro-2-propanol, 2,2,3,4,4,4-hexafluoro-1-butanol, 1,1,1,2,2,3,3-heptafluoro-4-butanol or 2,2,3,3,4,4,5,5-octafluoro-1-pentanol.

5. Method according to claim 1, in which the membrane is a polymer membrane chosen from amongst membranes of cellulose, polyacrylonitrile, polysulphone or polyethersulphone, which can include functionalised groups introducing a positive or negative charge.

6. Method according to claim 1, in which the organic solvent is chosen from amongst tetrahydrofuran, alcohols or ketones.

7. Method according to claim 1, in which the membrane is moistened before application.

8. Membrane obtainable by the method of any one of claims 1,2,3,4,5,6, or 7.

9. Method for the regeneration of photographic baths which comprises the step of contacting the bath with the membrane made by the method of claim 1 and recycling as photographic bath the retentate obtained from the contacting step.

10. Method according to claim 9 wherein said photographic bath is a black and white developing bath.

* * * * *